United States Patent
Li et al.

(10) Patent No.: US 12,228,966 B2
(45) Date of Patent: Feb. 18, 2025

(54) APPARATUS AND A METHOD FOR A CONTROLLABLE FOLDABLE DISPLAY WITH HAPTIC AND SOUND EFFECT

(71) Applicant: Huawei Technologies Co., Ltd., Shenzhen (CN)

(72) Inventors: Ming Li, Helsinki (FI); Guoping Luo, Helsinki (FI); Pasi Pylvas, Helsinki (FI)

(73) Assignee: Huawei Technologies Co., Ltd., Shenzhen (CN)

( * ) Notice: Subject to any disclaimer, the term of this patent is extended or adjusted under 35 U.S.C. 154(b) by 276 days.

(21) Appl. No.: 17/759,022

(22) PCT Filed: Feb. 26, 2020

(86) PCT No.: PCT/EP2020/055025
§ 371 (c)(1),
(2) Date: Jul. 18, 2022

(87) PCT Pub. No.: WO2021/170229
PCT Pub. Date: Sep. 2, 2021

(65) Prior Publication Data
US 2023/0034607 A1 Feb. 2, 2023

(51) Int. Cl.
*G06F 1/16* (2006.01)
*G06F 3/01* (2006.01)
*G06F 3/041* (2006.01)

(52) U.S. Cl.
CPC .......... *G06F 1/1618* (2013.01); *G06F 1/1643* (2013.01); *G06F 3/016* (2013.01); *G06F 3/0414* (2013.01)

(58) Field of Classification Search
CPC ...... G06F 1/1618; G06F 1/1643; G06F 3/016; G06F 3/0414
See application file for complete search history.

(56) References Cited

U.S. PATENT DOCUMENTS

| | | | |
|---|---|---|---|
| 9,524,030 B2 * | 12/2016 | Modarres | G06F 1/1652 |
| 9,823,631 B1 | 11/2017 | Loo et al. | |
| 2004/0016809 A1 * | 1/2004 | Song | G09B 5/062 235/449 |
| 2011/0261021 A1 | 10/2011 | Modarres et al. | |
| 2013/0145692 A1 | 6/2013 | Laird et al. | |

(Continued)

FOREIGN PATENT DOCUMENTS

| | | | |
|---|---|---|---|
| CN | 104545936 A | * | 4/2015 |
| CN | 106133636 A | | 11/2016 |

(Continued)

OTHER PUBLICATIONS

Vimeo, "A laptop with a motorised hinge . . . ", https://vimeo.com/10500941, Aug. 11, 2016, 2 pages.

*Primary Examiner* — Jerry Wu
(74) *Attorney, Agent, or Firm* — Slater Matsil, LLP

(57) ABSTRACT

An apparatus, comprising: a foldable touch display; a motor adapted to control a mechanism for switching the foldable touch display between an unfolded state and a folded state in a rolling motion; and a controller adapted to: detect a user input, calculate a velocity vector of the user input, and control the motor for switching the foldable touch display between the unfolded state and the folded state according to the calculated velocity vector of the user input.

18 Claims, 12 Drawing Sheets

(56) References Cited

U.S. PATENT DOCUMENTS

2016/0246330 A1* 8/2016 Kim .................. G06F 1/1652
2018/0004251 A1   1/2018 Magi et al.
2019/0064996 A1   2/2019 Heubel
2020/0316784 A1* 10/2020 Tuovinen ............... B25J 9/1635

FOREIGN PATENT DOCUMENTS

| | | | | |
|---|---|---|---|---|
| CN | 106875846 | A | 6/2017 | |
| CN | 108259649 | A * | 7/2018 | ........... G06F 1/1624 |
| CN | 110493396 | A | 11/2019 | |
| EP | 2981050 | A1 * | 2/2016 | ........... G06F 1/1641 |
| EP | 3531230 | A2 * | 8/2019 | ....... G02F 1/133305 |
| EP | 3594778 | A1 | 1/2020 | |
| JP | 2010013824 | A | 1/2010 | |
| KR | 20130068538 | A | 6/2013 | |
| KR | 20140066064 | A | 5/2014 | |
| KR | 20170104386 | A | 9/2017 | |
| KR | 20170140976 | A | 12/2017 | |
| KR | 20190017010 | A | 2/2019 | |
| WO | 2012098473 | A2 | 7/2012 | |
| WO | 2019153818 | A1 | 8/2019 | |

* cited by examiner

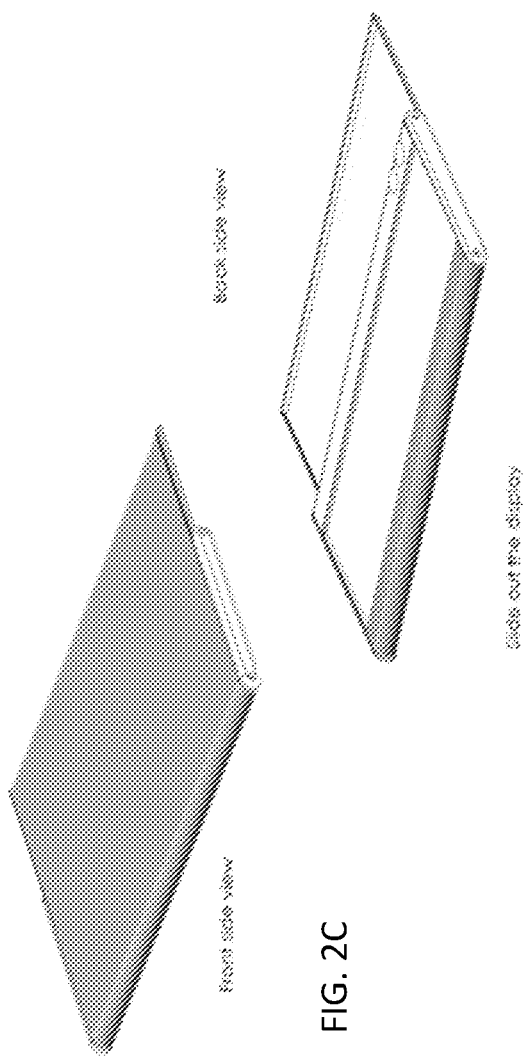

APPARATUS AND A METHOD FOR A CONTROLLABLE FOLDABLE DISPLAY WITH HAPTIC AND SOUND EFFECT

CROSS-REFERENCE TO RELATED APPLICATIONS

This application is a national stage of International Application No. PCT/EP2020/055025, filed on Feb. 26, 2020, which is hereby incorporated by reference in its entirety.

TECHNICAL FIELD

The present disclosure, in some embodiments thereof relates to a foldable touch display, more specifically, but not exclusively, to an apparatus and a method for a touch and gesture controllable foldable display with haptic and sound effect.

BACKGROUND

In recent years, foldable display technology is integrated in a wide line of electronic devices, from smartphones and smart television to laptops.

Touch displays are input or output devices of a visual electronic device with a data processing system, which a user can control by touching the display with a special stylus or one or more fingers. A foldable touch display is a touch display which is flexible and which can bend.

Usually a rigid touch display is based on Liquid crystal display (LCD) panel covered with a layer of glass, which is rigid and not flexible. However, the foldable touch display is usually based on organic light electronic diode (OLED) panel covered with a thin plastic layer—which enables the display to bend and fold.

SUMMARY

It is an object of the present disclosure to provide an apparatus, and a method for folding/unfolding or for opening/closing a foldable touch display with a changing velocity by providing an intuitive and effective user input of a touch event or freehand gesture for folding/unfolding or for opening/closing the foldable touch display, yet avoiding accidental folding/unfolding or opening/closing of the foldable touch display.

It is another object of the present disclosure to provide an apparatus and a method for controlling a foldable touch display with a haptic feedback and sound effects, which improve usability and effectiveness of user inputs while reduce system complexity.

The foregoing and other objects are achieved by the features of the independent claims. Further implementation forms are apparent from the dependent claims, the description and the figures.

The foldable touch displays of the disclosure solves the problem of folding/unfolding foldable touch displays with a constant velocity by a motor. According to some embodiments of the disclosure, the foldable touch display provides an intuitive solution of an apparatus with a foldable touch display, which folds/unfolds the foldable touch display by a motor with a changing velocity according to the user input.

According to a first aspect, an apparatus comprising: a foldable touch display, a motor adapted to control a mechanism for switching the foldable touch display between an unfolded (opening) state and a folded (closing) state in a rolling motion, and a controller adapted to: detect a user input, calculate a velocity vector of the user input, and control the motor for switching the foldable touch display between the unfolded (opening) state and the folded (closing) state according to the calculated velocity vector of the user input.

In a further implementation of the first aspect, the apparatus further comprises a haptic actuator adapted to generate a haptic feedback to the user input during the rolling motion.

In a further implementation of the first aspect, or the first possible implementation of the first aspect the haptic feedback comprises a dynamic haptic pattern defined by a set of an amplitude and a frequency changing according to the calculated velocity vector of the user input.

In a further implementation of the first aspect, or the second possible implementation of the first aspect the controller is adapted to control a dynamic duty cycle of the motor based on the amplitude and frequency of the dynamic haptic pattern, thereby changing a speed of rolling motion of the foldable touch display according to the user input.

In a further implementation of the first aspect, or the third possible implementation of the first aspect the controller is configured to adjust the dynamic duty cycle of the motor to correspond to the generated haptic feedback.

In a further implementation of the first aspect, or the second possible implementation of the first aspect, the controller is configured to control a speed of the motor to correspond to at least one of the amplitude and frequency of the dynamic haptic pattern.

In a further implementation of the first aspect, the mechanism for switching foldable touch display comprises a plurality of gears and a gear shaft actuated by the motor to induce a bidirectional movement of the foldable touch display.

In a further implementation of the first aspect, the motor is selected from a group consisting of: a voltage controlled motor, a direct current, DC motor and a stepper motor.

In a further implementation of the first aspect, the user input is a touch event detected by the foldable touch display and/or freehand gesture detected by a motion sensor or a camera.

In a further implementation of the first aspect, with reference to the eight possible implementation of the first aspect, the controller is configured to calculate the velocity vector according to at least one of pressure, speed, direction and coordinates of the touch event.

In a further implementation of the first aspect, with reference to the eighth possible implementation of the first aspect, the controller is configured to present a graphical user interface on the foldable touch display in response to a detection of the touch event for switching the foldable touch display between an unfolded state and a folded state and between a folded state and an unfolded state.

In a further implementation of the first aspect, the user input comprises a plurality of touch events detected by the foldable touch display and the velocity vector is calculated based on the plurality of touch events.

In a further implementation of the first aspect, the controller is configured to instruct a speaker to play a sound effect during the rolling motion of the foldable touch display.

In a further implementation of the first aspect, with reference to the thirteenth possible implementation of the first aspect, the controller is configured to dynamically select the sound effect from a group of sound effects based on the user input.

According to a second aspect, a method, comprising: controlling by a motor a mechanism for switching a foldable touch display between an unfolded state and a folded state in a rolling motion and detecting a user input by a controller adapted to: calculating a velocity vector according to the detected user input, and controlling the motor according to the calculated velocity vector of the user input.

In a further implementation of the second aspect, the method further comprises generating a haptic feedback to the user input during the rolling motion.

In a further implementation of the second aspect, with reference to the first possible implementation of the second aspect, the haptic feedback having a dynamic haptic pattern with an amplitude and frequency set according to the calculated velocity vector of the user input.

In a further implementation of the second aspect, with reference to the second possible implementation of the second aspect, the controller is adapted to control a dynamic duty cycle of the motor, based on the amplitude and frequency of the dynamic haptic pattern, thereby changing a speed of rolling motion of the foldable touch display according to the user input.

In a further implementation of the second aspect, with reference to the third possible implementation of the second aspect, the method further comprises adjusting by the controller, the dynamic duty cycle to correspond with a generation of the haptic feedback.

In a further implementation of the second aspect, with reference to the fourth possible implementation of the second aspect, the method further comprises controlling a speed of the motor to correspond with at least one of the amplitude and frequency of the dynamic haptic pattern.

In a further implementation of the second aspect, the user input is a touch event detected by the display and/or freehand gesture detected by a motion sensor.

In a further implementation of the second aspect, with reference to the sixth possible implementation of the second aspect, calculating the velocity vector is done according to at least one of: pressure, speed, direction and coordinates of the touch event.

In a further implementation of the second aspect, with reference to the sixth possible implementation of the second aspect, the method further comprises presenting a graphical user interface on the display in response to a detection of the touch event for switching the foldable touch display between an unfolded state and a folded state and between a folded state and an unfolded state.

In a further implementation of the second aspect, the user input comprises a plurality of simultaneous touch events detected by the display and the velocity vector is calculated based on a plurality of velocities each of one of the plurality of simultaneous touch events.

In a further implementation of the second aspect, the method further comprising playing a sound effect during the rolling motion of the foldable touch display, and dynamically selecting the sound effect from a group of sound effects based on the user input.

Unless otherwise defined, all technical and/or scientific terms used herein have the same meaning as commonly understood by one of ordinary skill in the art to which the disclosure pertains. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

In the following detailed portion of the present disclosure, the aspects, embodiments and implementations will be explained in more detail with reference to the example embodiments shown in the drawings.

In the drawings:

FIG. 2A-2D schematically shows an example of a smartphone with a foldable touch display in a folded and an unfolded state, according to some embodiments of the present disclosure;

DETAILED DESCRIPTION OF ILLUSTRATIVE EMBODIMENTS

Figure 1:
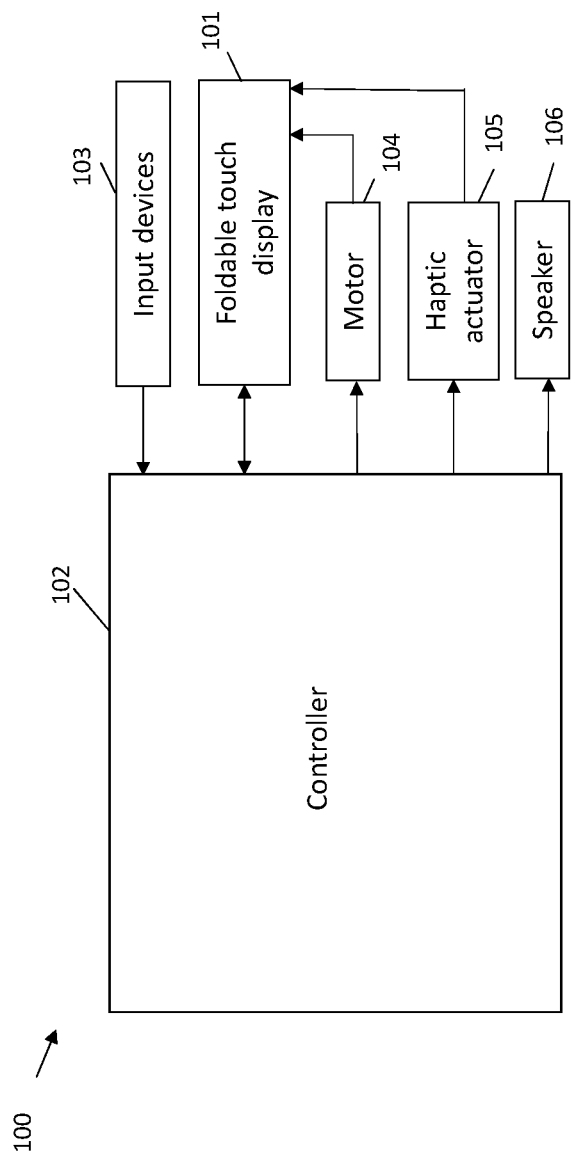
FIG. 1 schematically shows a flow diagram of the flow of data between operating components of an apparatus having a foldable touch display, according to some embodiments of the present disclosure; display in a folded and an unfolded state, according to some embodiments of the present disclosure.

The present disclosure, in some embodiments thereof relates to a foldable touch display, more specifically, but not exclusively, to apparatuses and methods for a controllable foldable display with haptic and sound effects.

The term apparatus as used herein refers to, for example, a communication device, a mobile device, mobile communication device, a smartphone, a smart television, a smart watch, a laptop, a screen of a computer and any screen and/or display of an electronic device, but not limited to these examples.

A foldable touch display is a flexible touch display, which may be bent and folded or unfolded, for example, which can be folded/unfolded or opened/closed by a rolling motion, which display.

Apparatuses existing today for folding or unfolding foldable touch displays, usually have a motor, which folds and unfolds the foldable touch display in a constant velocity. However, sometimes a user is in a hurry and needs to fold or unfold his foldable touch display faster or in a more intuitive way. Alternatively, sometimes the user wishes to fold or unfold the foldable touch display slowly or running application need to fold/unfold the foldable touch display slowly or gradually so as to achieve a specific effect. Sometimes, under certain using environment condition such as at low temperature, the foldable touch display must be folded/unfolded slowly so as to avoid damage of the screen. The existing apparatuses with foldable touch display do not allow changing the velocity of the foldable touch display. Therefore there is need to provide an apparatus with a foldable touch display, which is folded and/or unfolded with a changing velocity based on the user input.

According to some embodiments of the present disclosure, an apparatus and a method are provided for controlling a foldable touch display by providing an intuitive user input for switching the foldable touch display from a folded state to an unfolded state and vice versa, with a velocity changing according to the user input.

According to some embodiments of the present disclosure, a user input for folding or unfolding the foldable touch display may be a touch event, a freehand gesture or an input provided by a special stylus. A gesture as related herein is a movement of a hand and/or one or more fingers of the user in parallel to the foldable touch display to provide input to the apparatus. A touch event refers to a gesture performed by a user while the user touches the foldable touch display during the performance of the gesture. A freehand gesture refers to a gesture performed by the user without touching the foldable touch display during the time of the gesture performance or operation.

Examples for a gesture may be a swiping movement, sliding from side to side of the display, moving from left to right, moving in a circle and moving from right to left, moving according to a pattern (for example, such a pattern can be defined by a user) and the like.

According to some embodiments of the present disclosure, the foldable touch display provides a dynamic haptic feedback that is changed based on parameters of the user input while the foldable touch display changes between folded and unfolded states. The dynamic haptic feedback of the present disclosure has amplitude and/or a frequency varying based on the user input. The dynamic haptic feedback gives users feedback of the touch inputs as well as the state of the touch display being moved according to the user tough inputs as it provides a dynamic haptic feedback, which changes constantly according to the input of the user. In this way, the user is informed by the haptic feedback whether the display is being in movements of unfolding or folding (i.e. opening or closing).

Moreover, in most of the foldable touch display existing today, when folding or unfolding the foldable touch display the rolling motion of the foldable touch display causes vibrations and noises. According to some embodiments of the present disclosure, the foldable touch display of the present disclosure provides a solution, which conceals the vibrations and noises problem, by playing a sound effect based on the user input during the rolling motion of the foldable touch display.

Before explaining at least one embodiment of the disclosure in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s).

In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which is a schematic flow diagram of data communication between operating components of an apparatus with a controllable foldable touch display, for folding/unfolding the foldable touch display with a changing velocity, according to some embodiments of the present disclosure. The apparatus also provides sound and haptic effects during a rolling motion for folding/unfolding the foldable touch display based on user input, according to some embodiments of the present disclosure. Apparatus 100 comprises a foldable touch display 101, a controller 102, input detection devices 103, a motor 104, a haptic actuator 105, and a speaker 106. The controller 102 controls the motor 104 and the haptic actuator 105 based on an input of a user. The input of the user is detected by the foldable touch display 101, or by the input detection devices 103, which comprise touch sensors, motion sensors, cameras and/or the like. The controller 102 generates a movement vector and calculates a velocity vector according to the input of the user and controls the motor 104 to switch the foldable touch display 101 between an unfolded state and a folded state and vice versa. The controller 102 also controls the haptic actuator 105 to provide a haptic feedback during the time the foldable touch display 101 switches between an unfolded state and a folded state and vice versa. In addition, the controller 102 controls the speaker 106 by instructing the speaker 106 to play a sound effect based on the user input during the time the foldable touch display 101 switches between an unfolded state and a folded state and vice versa. In case the user uses earbuds, the sound effect is outputted through the earbuds.

Figure 2B:
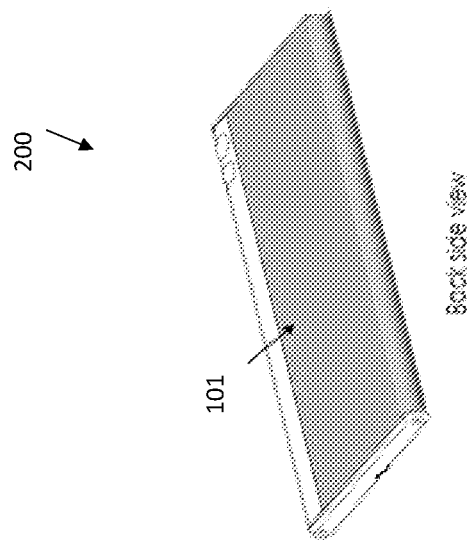
Figure 2A:
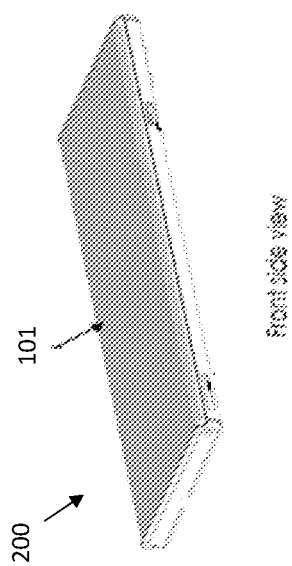

Reference is now made to FIGS. 2A-2B, which schematically show an example of a mobile communication device such as a smartphone 200 with a foldable touch display in a folded state, according to some embodiments of the present disclosure.

FIG. 2A schematically shows a front side view of smartphone 200, where a foldable touch display 101 is in a folded state, which may also be referred to herein as a close state. FIG. 2B schematically shows a back side view of smartphone 200, where a foldable touch display 101 is in a folded state.

The foldable touch display 101 is faced outwards, so that when it is in a folded state, two displays are provided for use, a front display and a back display. These two displays may be used either separately or coherently depending on the usage scenario and the configuration of the system and/or applications in use. For example, when a user needs to use two different applications in his smartphone he can use the two displays separately, each display for a different application.

However, sometimes the two displays can be used as one coherent display for some applications, for example for reading an article.

FIGS. 2C-2D schematically show smartphone 200 with a foldable touch display in an unfolded state, according to some embodiments of the present disclosure.

FIG. 2C schematically depicts a front side view of smartphone 200 with the foldable touch display 101 in an unfolded state. FIG. 2D schematically depicts a back side view of smartphone 200 with the foldable touch display in an unfolded state.

The unfolded state of the foldable touch display may also be referred herein to as an open state or as an entire display. In the unfolded state, the foldable touch display is opened, or opened into its maximum size so as to allow the user to interact with the entire display. In some embodiments of the present disclosure, the foldable touch display is folded/unfolded to a partially folded/unfolded state. For example, the foldable touch display may be folded to a 40% closed state, 60% closed state, 80% closed state and/or the like.

According to some embodiments of the present disclosure, a user input such as a touch event or a freehand gesture is used for folding/unfolding the foldable touch display. Once the user provides a user input, the controller activates the motor 104, which controls a mechanism for switching the foldable touch display in a rolling motion or in step movement(s) between an unfolded state and a folded state and vice versa.

Figure 3:
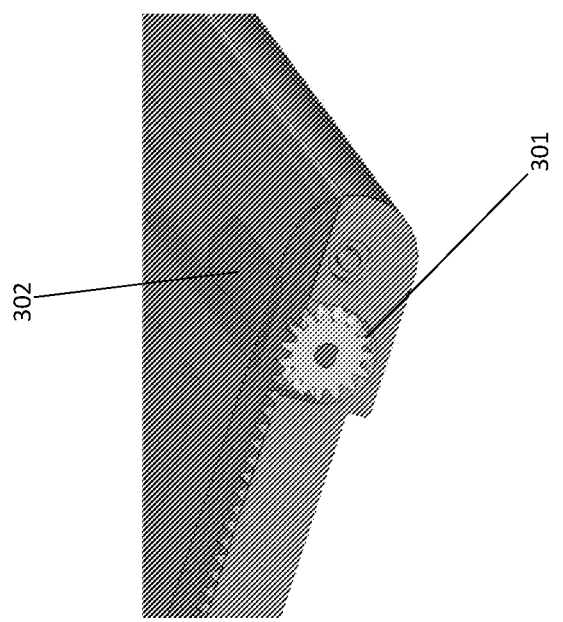
FIG. 3 schematically shows the mechanism for switching the foldable touch display between an unfolded state and a folded state, according to some embodiments of the present disclosure.

FIG. 3 schematically shows a mechanism for switching the foldable touch display between an unfolded state and a folded state and vice versa, according to some embodiments of the present disclosure. The depicted mechanism comprises a plurality of gears such as gear 301 and a gear shaft 302. Gear shaft 302, is actuated by the motor 104 to induce a movement of the foldable touch display, optionally a bidirectional movement. Gear 301 is placed at a first edge of the rolling motion hinge, and a second gear (not shown) is placed at the second edge of the rolling motion hinge. The gears are placed under the foldable touch display. Gear shaft 302 is placed along the rolling motion hinge, under the foldable touch display. The motor is a voltage-controlled motor, and is controlled by a controller. The controller instructs a battery to provide voltage to the motor when a user input for folding/unfolding the foldable display is detected by the controller and/or by the foldable touch display. The higher is the voltage provided to the motor, the faster is the movement of the gear shaft 302, which derives the foldable touch display to fold/unfold faster.

The movement direction of the foldable touch display may be bidirectional to enable both the folding and unfolding of the foldable touch display. The first direction of the gear shaft induces a rolling motion, which causes switching from a folded state to an unfolded state of the foldable touch display. The second direction of the gear shaft induces a rolling motion, which causes switching from an unfolded state to a folded state of the foldable touch display.

According to some embodiments of the present disclosure, the motor is implemented as a voltage controlled motor, a direct current motor (DC motor) and a stepper motor. When the motor is implemented as a stepper motor, the controller instruct the stepper motor to perform some equal or non-equal steps to achieve a full rotation.

According to some embodiments of the present disclosure, controller 102, detects a user input, for example, a touch event, where the user touches the foldable touch display, which is detected by the foldable touch display via touch sensor located on or under the foldable touch display. Another example for a user input is a freehand gesture, where the user does not touch the foldable touch display, and then the freehand gesture is detected by a camera or by a motion sensor.

As used herein a motion sensor is any device that detects moving objects, particularly people or body parts, for example a light detector, an acoustic sensor, and/or an accelerometer.

The controller also calculates a velocity vector of the user input and controls the motor for switching the foldable touch display between the unfolded state and the folded state according to the calculated velocity vector of the user input.

According to some embodiments of the present disclosure, when the user provides a touch event to fold/unfold the foldable touch display, the movement of one or more fingers of the user is captured by touch sensors located on the foldable touch display. In particular, coordinates, pressure, speed and direction of each finger are measured. The controller 102 generates a movement vector and calculates a velocity vector for the movement vector.

Figure 7A:
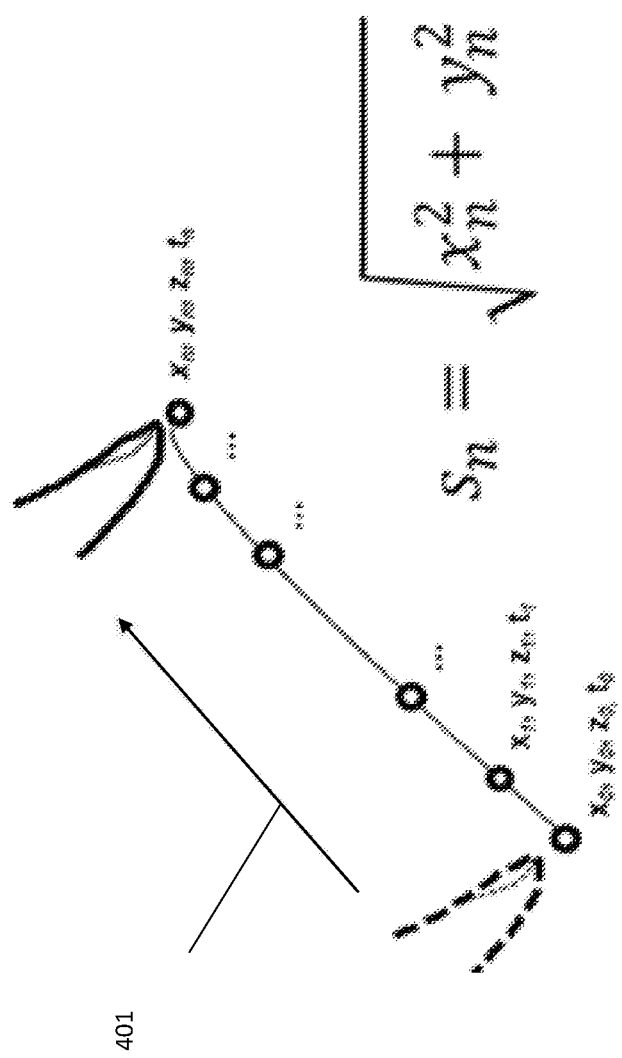
FIG. 7A-7B schematically shows an illustration of the measurements measured for generating the movement vector and calculating the velocity vector by the controller, according to some of the embodiments of the present disclosure.
Figure 7B:
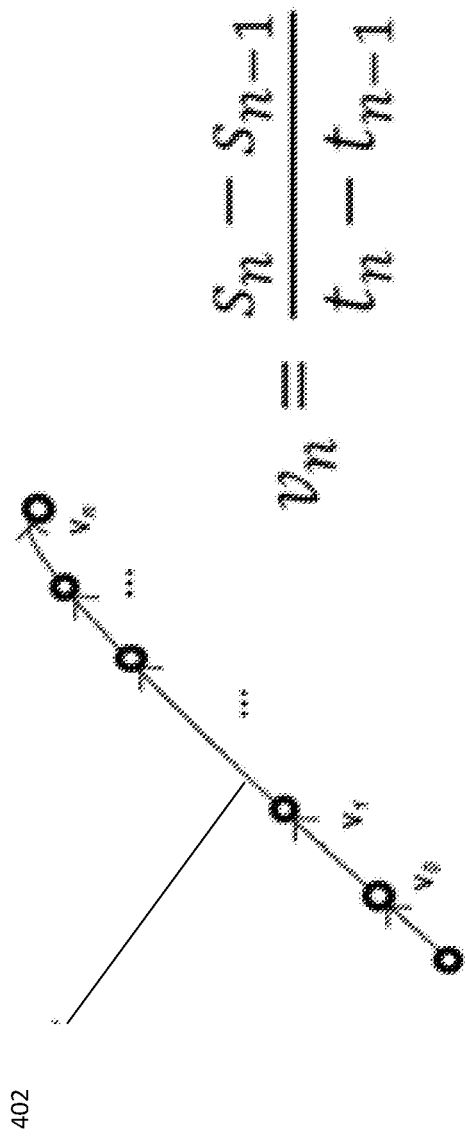

FIGS. 7A-7B schematically show an illustration of the generated movement vector and calculated velocity vector by the controller, according to some of the embodiments of the present disclosure. In FIG. 7A a movement of a finger of the user is detected by the foldable touch display 101 and the following measurements are measured: the location coordinates denoted as $x_n$ and $y_n$, the pressure of the finger denoted as $z_n$ (also referred to as pressure), and the timestamp of the location coordinate denoted as $t_n$, where n=0, 1, 2, 3 . . . n. The controller 102 generates a movement vector denoted as $s_n$ according to the formula:

$$s_n = \sqrt{x_n^2 + y_n^2}$$

Then the controller 102 calculates for each movement vector denoted as $s_n$, a velocity vector denoted as $v_n$ as shown in FIG. 7B, according to the formula:

$$v_n = \frac{s_n - s_{n-1}}{t_n - t_{n-1}}$$

According to some embodiments of the disclosure, the controller 102 presents a graphical user interface of a virtual slider on the foldable touch display in response to a detection of the touch event for switching the foldable touch display between an unfolded state and a folded state and vice versa. The virtual slider is an image presented on the display with which the user interacts.

The user interacts with the virtual slider by moving one or more fingers along the virtual slider to fold/unfold the foldable touch display. This way a touch event intended to fold/unfold the foldable touch display is distinguished from a touch intended to operate with the foldable touch display. Also, this way, with the virtual slider, the foldable touch display is not accidently opened in response to an accidental touch event in the foldable touch display.

According to some embodiments of the disclosure, the user is required to tap the foldable touch display using at least one finger (notably, 1 finger or 2, 3, 4 or 5 fingers) and move the at least one finger across the foldable touch display. Such a tapping and moving gesture is also commonly referred to as "Swiping".

According to some embodiments of the disclosure, the finger movement controls the motor 104 with use of a finger velocity vector, which determines a velocity with which the foldable touch display is folded or unfolded.

Figure 4:
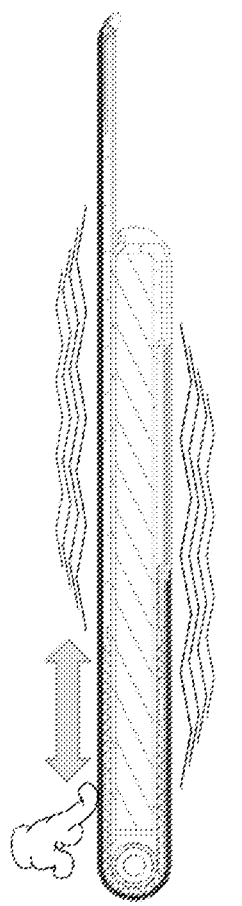
FIG. 4 is a schematic example of a haptic feedback provided by a haptic actuator in response to a touch event of a user, according to some of the embodiments of the present disclosure.

According to some embodiments of the disclosure, when the display is folded or unfolded, the controller 102 instructs the haptic actuator 105 to generate a haptic feedback during the rolling motion or step movements. When a given finger touches the virtual slider to fold/unfold the foldable touch display, the virtual slider communicates with the haptic actuator 105. In such a case, the haptic actuator 105 receives an actuating signal, and then dynamically play a haptic (tactile) pattern with a changing frequency and amplitude. FIG. 4 schematically shows an example for the haptic feedback provided by the haptic actuator 105 in response to a touch event of the user, according to some embodiments of the disclosure. The haptic feedback can be dynamically generated per finger input parameters. This means no stored haptic patterns are used so that no haptic patterns need to be pre-stored, but the haptic feedback is always constantly adjusted according to the finger movement.

The finger input parameters are:
coordinates of finger movement;
pressure of finger movement;
speed of finger movement; and
direction of finger movement (This is used for determining a direction of rolling the display).

According to some embodiments of the disclosure, the foldable touch display detects direction, distance, speed, and/or acceleration of the finger movement. The controller 102 may use the detected speed and direction of the finger movement to calculate the velocity vector. Moreover, pressure sensors under the foldable touch display determine different pressure levels and changes in these pressure levels, thereby determining the pressure of the finger movement.

According to some embodiments of the disclosure, the controller 102 instructs a speaker 106 to play a sound effect during the rolling motion or step movements of the foldable touch display 101, when the foldable touch display is folded/unfolded. The controller 102 is configured to dynamically select the sound effect from a group of sound effects either pre-stored or dynamically generated based on the user input.

In some embodiments of the present disclosure, the sound effect is provided to conceal noise and vibrations introduced by gear movement. Notably, the user may use different finger movement patterns, for example, a slow and fast slide, heavy and light pressure, and/or the like, while swiping to make the touch event. Moreover, the user may even change the finger movement patterns randomly. The selection of sound effects is adapted to the dynamical changes of the touch input(s) or event(s).

When the foldable touch display is folded/unfolded or opened/closed, the controller provides a dedicated dynamic haptic feedback and/or sound effect along with the foldable touch display rolling motion or stepped movements. The haptic feedback increases provides additional feedback information to the user on whether the user input is properly received and interpreted so that the display is in the right movements. The haptic feedback improves sensitivity, reliability and proper operation of the foldable touch display. The sound effect played during the rolling motion or steppe movements of the foldable touch display conceals or reduces the unsmooth vibration and inharmonic noise introduced by the gear movement.

According to some embodiments of the present disclosure, the various combinations of the pressure of the finger movement and other attributes (notably, the coordinates and speed) of the finger touch event may trigger countless combinations of haptic feedback and sound effect.

Figure 5:
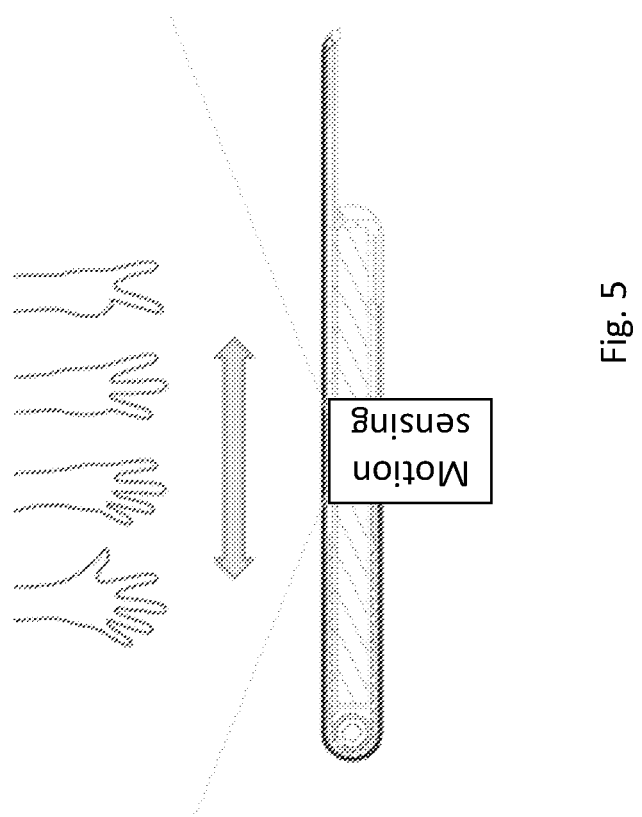
FIG. 5 schematically shows examples of a freehand gesture for switching the foldable touch display between an unfolded state and a folded state, according to some embodiments of the present disclosure.

According to some embodiments of the present disclosure, the user input for folding/unfolding the foldable touch display is a freehand gesture. For example, FIG. 5 schematically shows exemplary freehand gestures. The apparatus with the foldable touch display includes motion sensors for detecting motions and freehand gestures in proximity to the front side of the apparatus. The front side of the apparatus (shown in FIG. 2A) is the one that faces the user, when the user uses the apparatus. The user makes the freehand gesture, which is a contactless gesture for folding or unfolding the foldable touch display in proximity of the front side of the smart device. Examples for motion sensors may be: a motion sensing camera, a digital camera, a millimeter Wave (mmWave) sensor, a time-of-flight camera and infrared sensor.

According to some embodiments of the present disclosure, a freehand gesture may be defined by one or more of the following constraints:

number of fingers used: two, three, four and/or five fingers;

moving pattern: sliding fingers in the air, parallel to the front side of the smart device;

and/or movement direction: from the gear shaft side to the other side of the foldable touch display, and vice versa.

Figure 9:
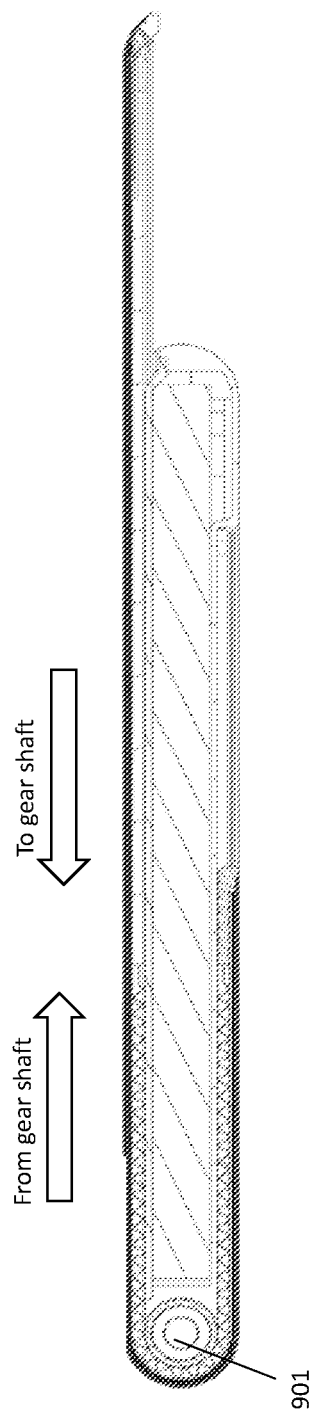
FIG. 9 schematically shows the directions for folding and unfolding the foldable touch display with a freehand gesture, according to some embodiments of the present disclosure.

FIG. 9 schematically shows the directions for folding and unfolding the foldable touch display with a freehand gesture, according to some embodiments of the present disclosure. The foldable touch display is unfolded to its maximum extent when the movement of the freehand gesture starts from the side of gear shaft 901 to the other side of the foldable touch display. The foldable touch display is folded when the movement of the freehand gesture is towards the gear shaft 901.

The constraints of the freehand gesture provide a check against accidental folding and/or unfolding of the foldable touch display. According to some embodiments of the present disclosure, when the user performs a freehand gesture, all the constraints of the freehand gesture are checked by the controller and are required to be met in order to fold and/or unfold the foldable touch display, else, the foldable touch display will not be folded and/or unfolded.

Figure 6:
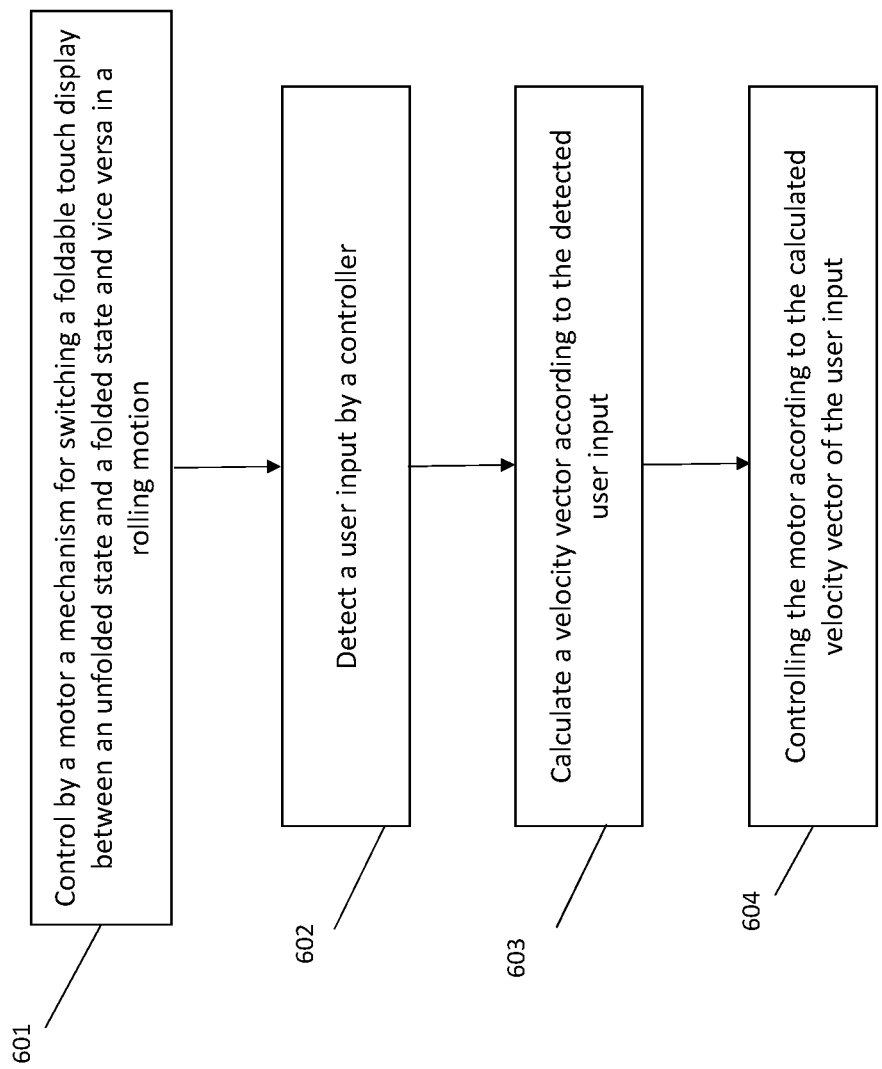
FIG. 6 is a schematic flowchart of a method for controlling a foldable touch display with a sound and haptic effect, according to some of the embodiments of the present disclosure.

Reference is now also made to FIG. 6, which is a schematic flowchart of a method for controlling a foldable touch display from a folded state to an unfolded state and vice versa with a user input, according to some embodiments of the present disclosure.

At 601, a motor 104 controls a mechanism for switching a foldable touch display 101 between an unfolded state and a folded state in a rolling motion. The mechanism may include gears and a gear shaft controlled by the motor 104 to induce a movement, optionally bidirectional, of the foldable touch display during the rolling motion. In some embodiments of the disclosure, the gears are provided under the foldable touch display 101 at the two edges of a rotational hinge, so as to allow the foldable touch display to switch between a folded state and an unfolded state and vice versa, when the gear shaft is moved by the motor. At 602 a user input is detected by a controller 102. The user input may be an input provided by a stylus, or by a user gesture. The user gesture may be a touch event where the user touches the foldable touch display during the gesture or a freehand gesture, where the user does not touch the foldable touch display during the gesture.

At 603, a velocity vector is calculated by the controller 102, according to the detected user input. The velocity vector is calculated from a movement vector, which is generated based on measurements taken by touch sensors located in the foldable touch display. The measurements are the location coordinates of the finger during the gesture, the pressure of the finger, the speed of the finger and the direction of the finger. At 604, the motor is controlled by the controller 102, according to the calculated velocity vector of the user input, so that when the velocity vector is higher the movement of the motor is faster and the rolling motion of the foldable touch display when folding/unfolding is higher.

According to some embodiments of the present disclosure, when the foldable touch display is folded or unfolded, a haptic feedback is generates during the rolling motion by a haptic actuator 105. The haptic feedback comprises a dynamic haptic pattern with a changing amplitude and frequency. The amplitude and frequency of the dynamic haptic pattern are dynamically changed according to the user touch event as a function of the measurements of location coordinates, pressure, speed and direction of the finger during the touch event.

According to some embodiments of the present disclosure, when the foldable touch display is folded/unfolded, a sound effect is played by a speaker to conceal vibrations and noises caused by the gear movements during the rolling motion.

According to some embodiments of the present disclosure, the duty cycle of the motor is dynamic and is based on the amplitude and frequency of the dynamic haptic pattern, thereby changing the speed of rolling motion of the foldable touch display according to the user input.

According to some embodiments of the present disclosure, the generation of the dynamic haptic pattern from finger movements and velocity of the user touch event comprises the steps of:

computing a finger movement vector per finger wherein the finger movement vector is a function of horizontal coordinates (x-axis coordinates) of finger touch, vertical coordinates (y-axis coordinates) of finger touch, pressure of finger touch, and timestamp of finger touch. A separate finger movement vector is generated for each finger of the user that touches the foldable touch display to perform the touch event for folding or unfolding the foldable touch display;

calculating for each finger movement vector, a velocity vector of finger movement;

generating the dynamic haptic pattern using the following principles:

the amplitude of the haptic pattern is directly proportional to the pressure of finger touch, which means that the stronger is the pressure of the finger touch the longer is the amplitude of the haptic pattern;

time duration of pauses between individual haptic patterns is inversely proportional to speed vector, which means that, the longer are the pauses between the generation of haptic patterns the speed vector increases, and the shorter are the pauses between the generation of haptic pattern the speed vector decreases.

Figure 7C:
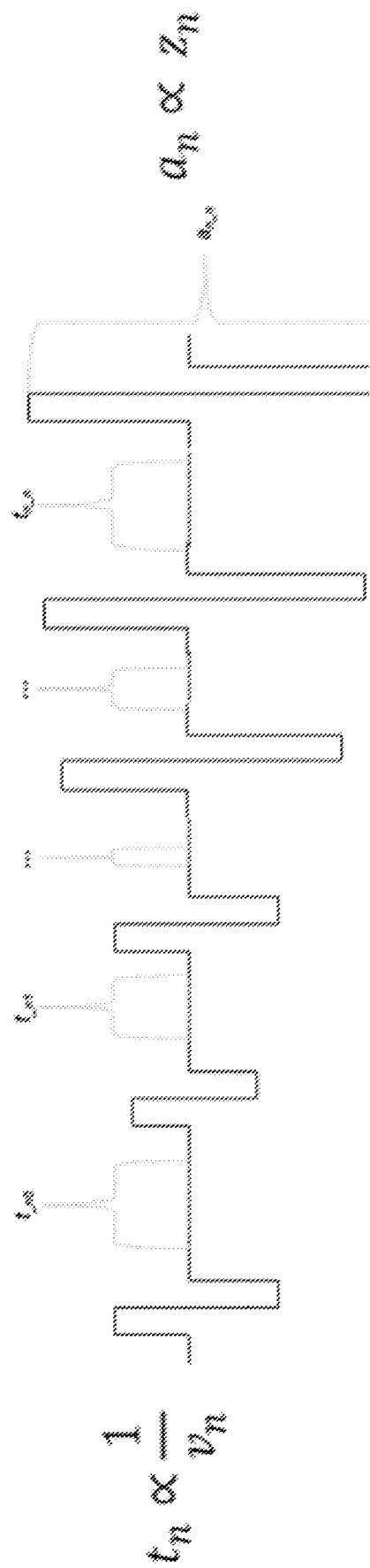
FIG. 7C is a schematic example of the haptic feedback generated based on the movement vector and velocity vector, according to some of the embodiments of the present disclosure.

FIGS. 7A-7C schematically shows diagrams, which depicts how the haptic pattern is generated according to some embodiments of the present disclosure. FIG. 7A schematically shows a finger movement, where the user performed a swipe touch gesture 401 on the foldable touch display in x, y, z, t. Where x denotes the horizontal coordinates, y denotes the vertical coordinates, z denotes the finger pressure and t denotes the time stamp of the touch coordinate. The movement vector is generated according to the following formula:

$$s_n = \sqrt{x_n^2 + y_n^2}$$

FIG. 7B schematically shows a velocity vector 402 of the finger movement, which the controller calculates for each finger movement vector, according to the following formula:

$$v_n = \frac{s_n - s_{n-1}}{t_n - t_{n-1}}$$

Where sn denotes a movement vector calculated from the x-y coordinates and an individual velocity vector denoted as vn is calculated.

FIG. 7C schematically shows an appropriate dynamic haptic pattern, which is determined in shape, amplitude and duration. Then, the duration of the whole haptic patterns is controlled by using velocity vectors denoted as $v_n$ and setting $t_n$ pauses in between individual haptic pattern. This way, the velocity is synced inversely to the time pauses denoted as $t_n$ inducing a longer pause when velocity is smaller and a shorter pause when velocity is higher. $z_n$ denotes the pressure value of the touch measurement and it determines the amplitude of the haptic pattern or each pulse.

According to some embodiments of the present disclosure, the duty cycle of the motor is generated based on the dynamic haptic pattern. Thereby the dynamic haptic pattern controls the speed of the motor according to the user input.

Figure 8:
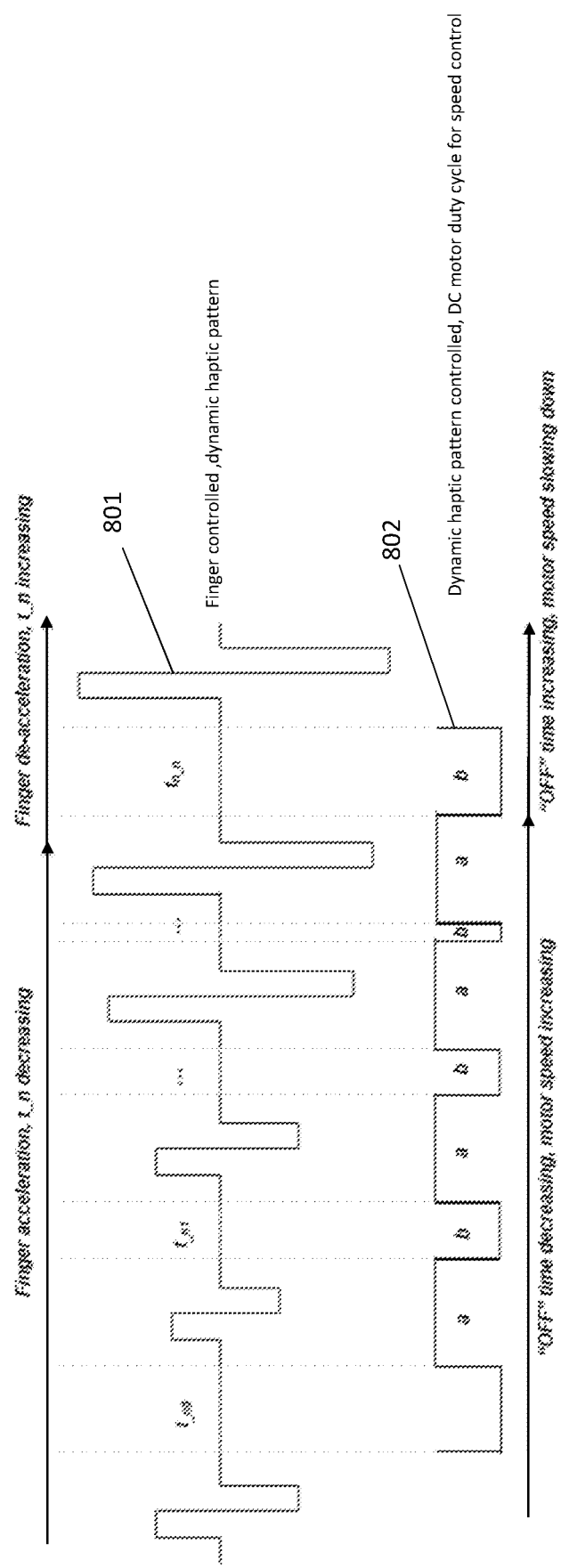
FIG. 8 schematically shows an example of generating a motor duty cycle controlled by the dynamic haptic pattern, according to some of the embodiments of the present disclosure.

FIG. 8 schematically shows an exemplary of a DC motor duty cycle generated based on the dynamic haptic pattern of FIG. 7C according to some embodiment of the present disclosure.

An ON OFF duty cycle controls the motor speed, where the ON time of the dynamic duty cycle corresponds to the time when the haptic feedback is generated and the OFF time of the dynamic duty cycle corresponds to the time when no haptic feedback is generated. As can be seen in FIG. 8, the dynamic haptic pattern 801, controlled by user input of finger touch movement comprises a changing amplitude and frequency. First, the duration t_n0 between the two first pulses of the dynamic haptic pattern is longer than t_n1, and t_n1 is longer than t_n2. This means that the finger/s of the user accelerate (i.e. moves faster and faster) so that the duration of the time between the pulses t_n decreases. As a result, the DC motor duty cycle 802, which is controlled by the dynamic haptic pattern, includes an OFF time, which decreases and so the speed of the motor increases. Moreover, when the t_n of the dynamic haptic pattern increases, the OFF time of the DC motor increases, meaning that the speed of the motor decreases and the motor slows down. The ON time is denoted as "a" in the dynamic duty cycle 802 of the DC motor presented in FIG. 8 and the OFF time is denoted as "b" in the dynamic duty cycle 802 of the DC motor presented in FIG. 8. The Duty ratio 13 of the DC motor is defined by the formula:

$$\beta = a/(a+b).$$

From the formula it can be seen that the more ON time (denoted as "a") for the DC motor voltage, faster is the motor speed.

Therefor, the Duty ratio may be controlled dynamically by using the time between the pulses of the dynamic haptic pattern as the OFF time of the duty cycle of the motor. FIG. 8 schematically shows how the time pauses t_n between the pulses of the dynamic haptic pattern 801, are decoded as the OFF time denoted as "b" in the duty cycle of the motor 802.

According to some embodiments of the disclosure, the haptic feedback is played by the haptic actuator. The faster the finger slides, the faster the foldable touch display folds or unfolds.

According to some embodiments of the disclosure, the controller controls the haptic actuator and the motor in series, or in parallel.

When the control is done in series, a touch event such as a finger movement on the foldable touch display is identified by the foldable touch display. Signals are sent from the foldable touch display to the controller, which contains a driver for the haptic actuator and a driver for the motor. The drivers control the haptic actuators and the motor and changes the haptic actuator status and the motor status respectively. The controller 102 generates the movement vector and calculates the velocity vector. The driver of the haptic actuator uses the velocity vector for determining the frequency of the dynamic haptic pattern t_n and the pressure parameter z for determining the amplitude of the dynamic haptic pattern. Then, the driver of the motor uses the dynamic haptic pattern frequency to determine the ON OFF ratio for controlling the speed of the motor.

When the control is in parallel, the foldable touch display detects a touch event and the controller generates the movement vector and calculates the velocity vector. Then, the driver of the haptic actuator uses the velocity vector for determining the frequency of the dynamic haptic pattern t_n and the pressure parameter z for determining the amplitude of the dynamic haptic pattern. In parallel, the driver of the motor determines the dynamic haptic pattern frequency to determine the ON OFF ratio for controlling the speed of the motor.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant controllable foldable touch displays will be developed and the scope of the term controllable foldable touch display is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Throughout this application, various embodiments of this disclosure may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

The invention claimed is:

1. An apparatus, comprising:
a foldable touch display;
a motor adapted to control the foldable touch display to switch between an unfolded state and a folded state in a rolling motion;
a controller adapted to:
detect a user input;
calculate a velocity vector of the user input; and
control the motor to cause the foldable touch display to switch between the unfolded state and the folded state according to the calculated velocity vector of the user input; and
a haptic actuator adapted to generate a haptic feedback to the user input during the rolling motion, wherein the haptic feedback follows a dynamic haptic pattern defined by a set of amplitude and frequency values, wherein the dynamic haptic pattern is determined according to the calculated velocity vector of the user input in a manner that time domain durations of pauses of the dynamic haptic pattern correspond to speed values of the calculated velocity vector respectively,
wherein the controller is adapted to adjust a corresponding dynamic duty cycle of the motor based on the set of amplitude and frequency values of the dynamic haptic pattern, thereby changing a speed of the rolling motion of the foldable touch display according to the user input, and
wherein a plurality of gears and a gear shaft are coupled to the motor, and the plurality of gears and the gear shaft are actuated by the motor to induce a bidirectional movement of the foldable touch display.

2. The apparatus of claim 1, wherein the controller is configured to adjust the corresponding dynamic duty cycle of the motor to correspond to the generated haptic feedback, wherein an ON time of the corresponding dynamic duty cycle corresponds to a time the haptic feedback is generated and an OFF time of the corresponding dynamic duty cycle corresponds to a time no haptic feedback is generated.

3. The apparatus of claim 1, wherein the controller is configured to control a speed of the motor to correspond to at least one value of the set of amplitude and frequency values of the dynamic haptic pattern.

4. The apparatus of claim 1, wherein the motor is selected from a group consisting of:
a voltage controlled motor, a direct current (DC) motor, and a stepper motor.

5. The apparatus of claim 1, wherein the user input is a touch event detected by the foldable touch display or a freehand gesture detected by a motion sensor or a camera.

6. The apparatus of claim 5, wherein the controller is adapted to calculate the velocity vector according to at least one of pressure, speed, direction, or coordinates of the touch event.

7. The apparatus of claim 5, wherein the controller is adapted to present a graphical user interface on the foldable touch display in response to a detection of the touch event, the graphical user interface being usable to cause the switching of the foldable touch display between the unfolded state and the folded state, and between the folded state and the unfolded state.

8. The apparatus of claim 1, wherein the user input comprises a plurality of touch events detected by the foldable touch display and the velocity vector is calculated based on the plurality of touch events.

9. The apparatus of claim 1, wherein the controller is adapted to instruct a speaker to play a sound effect during the rolling motion of the foldable touch display.

10. The apparatus of claim 9, wherein the controller is adapted to dynamically select the sound effect from a group of sound effects based on the user input.

11. A method, comprising:
detecting a user input by a controller;
calculating, by the controller, a velocity vector according to the detected user input;
generating haptic feedback to the user input, wherein the haptic feedback follows a dynamic haptic pattern defined by a set of amplitude and frequency values, wherein the dynamic haptic pattern is determined according to the calculated velocity vector of the detected user input in a manner that time domain durations of pauses of the dynamic haptic pattern correspond to speed values of the calculated velocity vector respectively; and
controlling a motor, by the controller, according to the calculated velocity vector of the user input, to cause a foldable touch display to switch between an unfolded state and a folded state in a rolling motion, comprising:

adjusting, by the controller, a corresponding dynamic duty cycle of the motor based on the set of amplitude and frequency values of the dynamic haptic pattern, thereby changing a speed of the rolling motion of the foldable touch display according to the user input; and wherein a plurality of gears and a gear shaft are coupled to the motor, and the plurality of gears and the gear shaft are actuated by the motor to induce a bidirectional movement of the foldable touch display.

12. The method of claim 11, further comprising adjusting by the controller, the corresponding dynamic duty cycle to correspond with the haptic feedback, wherein an ON time of the corresponding dynamic duty cycle corresponds to a time the haptic feedback is generated and an OFF time of the corresponding dynamic duty cycle corresponds to a time no haptic feedback is generated.

13. The method of claim 12, further comprising controlling a speed of the motor to correspond with at least one value of the set of amplitude and frequency values of the dynamic haptic pattern.

14. The method of claim 11, wherein the motor is selected from a group consisting of:
a voltage controlled motor, a direct current (DC) motor, and a stepper motor.

15. The method of claim 11, wherein the user input is a touch event detected by the foldable touch display or a freehand gesture detected by a motion sensor or a camera.

16. The method of claim 11, wherein calculating, by the controller, the velocity vector according to the detected user input comprises:
calculating the velocity vector according to at least one of pressure, speed, direction, or coordinates of the user input.

17. The method of claim 11, further comprising:
presenting a graphical user interface on the foldable touch display in response to a detection of the user input, the graphical user interface being usable to cause the switching of the foldable touch display between the unfolded state and the folded state, and between the folded state and the unfolded state.

18. The method of claim 11, wherein the user input comprises a plurality of touch events detected by the foldable touch display and the velocity vector is calculated based on the plurality of touch events.

* * * * *